Patented Oct. 22, 1929

1,732,230

UNITED STATES PATENT OFFICE

PAUL RALPH HERSHMAN, OF CHICAGO, ILLINOIS, ASSIGNOR OF TWENTY-FIVE PER CENT TO C. O. SETHNESS, TWENTY-FIVE PER CENT TO C. H. SETHNESS, AND TWENTY-FIVE PER CENT TO PAUL RUDNICK, ALL OF CHICAGO, ILLINOIS

PRODUCTION OF SOLID STABLE HYPOCHLORITES YIELDING HYPOCHLOROUS ACID

No Drawing.   Application filed February 9, 1927.   Serial No. 167,070.

This invention relates to a valuable method of producing compounds which, when dissolved in water, will give up the entire amount, or part of the amount of −OCl which they contain, in the form of free hypochlorous acid.

Heretofore some methods have been devised to prevent chloride of lime from decomposing, for instance by admixture of common salt or of Glauber salt. These admixtures however, reduce the chlorine contents to a large extent and do not improve the solubility.

I have now found that the addition of dry acids, such as citric or tartaric, or of acid salts like $NaHSO_4$ or even of aluminum chloride, $Al_2Cl_6$, will render partly water soluble hypochlorous compounds such as chloride of lime, or water-insoluble compounds, such as the corresponding compounds of magnesium, zinc, or iron, perfectly water soluble, at the same time yielding all or part of the −OCl group in form of HOCl.

In applying my processes to the water insoluble hypochlorites it is necessary to add at least so much of the acid or acid compound that all of the base will be converted into the salt corresponding to such acid. When using a partly water-soluble compound such as chloride of lime, comparatively less of the acid or acid compound can be used, than in the case of an insoluble hypochlorite, and the resulting compound, when brought in contact with water, will dissolve partly in form of hypochlorites plus salts, and partly as hypochlorous acid. It is very remarkable, that in these cases either alkaline, or neutral, or acid solutions can be obtained, as one would naturally assume that all these solutions would be acid.

When these compounds are compressed into tablet form, they not only keep indefinitely without any loss of chlorine contents, but also their solubility in water is remarkably increased, even if no binder is added although perhaps the opposite could be expected.

In carrying out these processes, for instance, one part of finely ground water-insoluble, basic magnesium hypochlorite is mixed with two and one-half of sodium acid sulfate, both previously dried. Or one part of dry calcium hypochlorite is mixed with one-fourth of aluminum chloride and one-half of a part of dry tartaric acid. The resulting compound, when dissolved in water, will be alkaline, when tested, for instance, according to the Soerenson method. On the other hand, one part of dry calcium hypochlorite mixed with three-fourths of a part of tartaric acid and the same of sodium acid sulfate, will yield a compound which, when dissolved in water, will be practically neutral.

Having thus described my intention, I claim:

1. The method of producing stable water soluble compounds yielding hypochlorous acid when in contact with water, by mixing dry material containing the −OCl group with a dry material capable of dissociating in water with the formation of an acid, and compressing the resulting product in tablet form.

2. The method of producing stable water soluble compounds yielding hyprochlorous acid when in contact with water, by mixing water insoluble dry material, containing the −OCl group, with a dry material capable of dissociating in water with the formation of an acid, and compressing the resulting product in tablet form.

3. The method of producing stable water soluble compounds yielding hypochlorous acid when in contact with water, by mixing a combination of water soluble and water insoluble dry material containing the −OCl group with a dry material capable of dissociating in water with the formation of an acid, and compressing the resulting product in tablet form.

4. The method of producing stable water soluble compounds yielding hypochlorous acid when in contact with water, by mixing dry material containing the −OCl group with a dry material capable of disassociating in water with the formation of an acid.

5. The method of producing stable water soluble compounds yielding hypochlorous acid when in contact with water, by mixing water insoluble dry material, containing the —OCl group with a dry material capable of disassociating in water with the formation of an acid.

6. The method of producing stable water soluble compounds yielding hypochlorous acid when in contact with water by mixing the combination of water soluble and water insoluble dry material containing the —OCl group with a dry material capable of disassociating in water with the formation of an acid.

7. The method of producing stable water soluble compounds yielding hypochlorous acid when in contact with water, by mixing a dry basic magnesium hypochlorite with material capable of disassociating in water with the formation of an acid.

8. The method of producing stable water soluble compounds yielding hypochlorous acid when in contact with water, by mixing a dry basic magnesium hypochlorite with material capable of disassociating in water with the formation of an acid in varying quantity depending upon whether the water soluble compound shall be neutral, alkaline, or acid.

9. The method of producing stable water soluble compounds yielding hypochlorous acid when in contact with water, by mixing insoluble dry magnesium hypochlorite with dry solid acid and material capable of disassociating in water with the formation of an acid.

10. The method of producing stable water soluble compounds yielding hypochlorous acid when in contact with water, by mixing insoluble dry magnesium hypochlorite with dry solid acid and an acid salt.

PAUL RALPH HERSHMAN.